United States Patent [19]

Mimura et al.

[11] Patent Number: 5,305,092
[45] Date of Patent: Apr. 19, 1994

[54] APPARATUS FOR OBTAINING THREE-DIMENSIONAL VOLUME DATA OF AN OBJECT

[75] Inventors: Itaru Mimura, Sayama, Japan; Tsuneya Kurihara, Preverenges, Switzerland

[73] Assignee: Hitachi, Ltd., Tokyo, Japan

[21] Appl. No.: 939,463

[22] Filed: Sep. 2, 1992

[30] Foreign Application Priority Data

Sep. 3, 1991 [JP] Japan .................. 3-222697

[51] Int. Cl.$^5$ .............................. G01B 11/24
[52] U.S. Cl. ................... 356/376; 356/379
[58] Field of Search ............. 356/375, 376, 379, 380

[56] References Cited

U.S. PATENT DOCUMENTS 4,585,704 4/1986 Ferren ..................... 382/65
5,151,609 9/1992 Nakagawa et al. .............. 356/376

OTHER PUBLICATIONS

Handbook of Optical Measurement, edited by T. Denko, Asakura Shoten Co., Ltd., pp. 582-595.
"Digital Composition of Images with Increased Depth of Focus Considering Depth Information", Satoshi A. Sugimoto and Yoshiki Ichioka, Applied Optics, vol. 24, No. 14, 1985.

Primary Examiner—F. L. Evans
Attorney, Agent, or Firm—Antonelli, Terry, Stout & Kraus

[57] ABSTRACT

An apparatus for obtaining three-dimensional volume data indicative of the shape of an object by processing the video signal resulting from picking up the object has an image projector for projecting a two-dimensional reference optical image containing a large amount of spatial high-frequency components on the surface of the object, a two-dimensional image pickup device for sequentially picking up the image of the object on which the two-dimensional optical image is projected, while the focal plane is being shifted, a range finder for extracting the high-frequency components of an image signal of a very small region including each of a plurality of detection points on the image picked up by said image pickup device, and detecting the best focal plane position where an in-focus condition is given, for each of the plurality of detection points from the change of the high-frequency components with the shift of the focal plane, and a memory for storing data of the best focal plane detected for each of the detection points as the three-dimensional volume data of the object.

6 Claims, 8 Drawing Sheets

FIG. 3
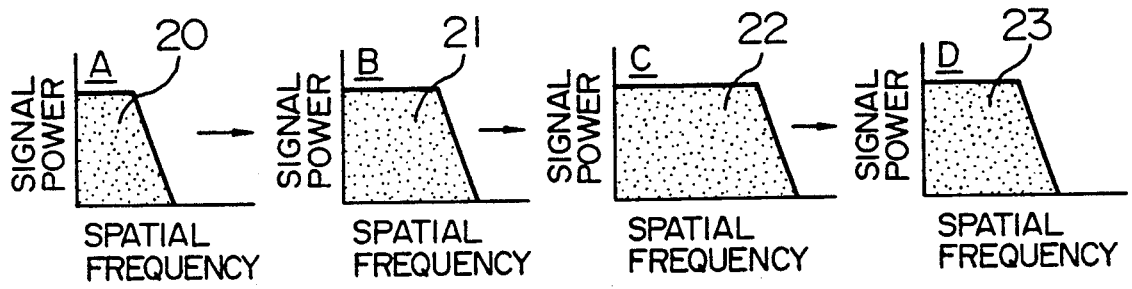
FIG. 4
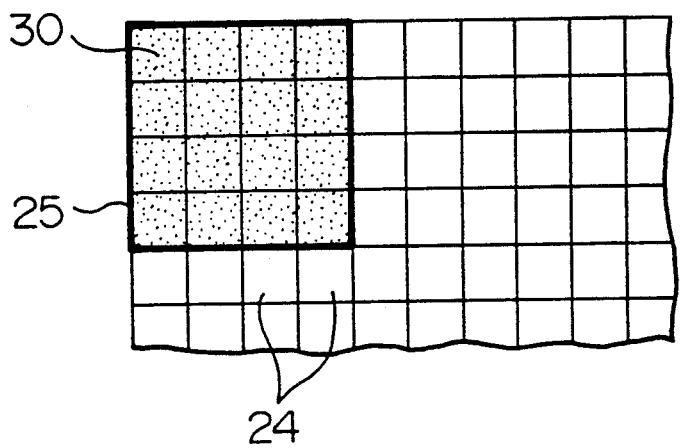
FIG. 5A  FIG. 5B  FIG. 5C  FIG. 5D

FIG. 6A  FIG. 6B  FIG. 6C  FIG. 6D
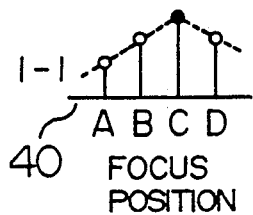 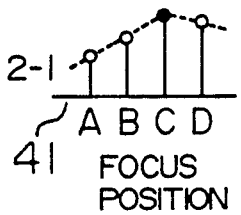 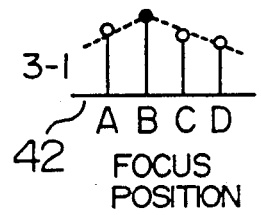 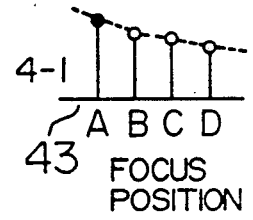
FIG. 7
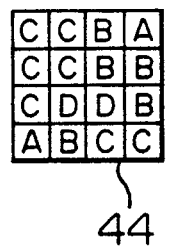

APPARATUS FOR OBTAINING THREE-DIMENSIONAL VOLUME DATA OF AN OBJECT

BACKGROUND OF THE INVENTION

This invention relates to apparatus for obtaining three-dimensional volume data of an object, and particularly to an apparatus for obtaining three-dimensional volume data of an object by picking up the image of the object and processing the image signal.

Recently, production of images by using a computer (CG: Computer Graphics) is very popular in broadcasting and movie production. In this CG, the image of an object (for example, a person, or a building) to be displayed on a screen is produced as a two-dimensional image from the wire frame model that is produced from the volume data of the shape of the object. Since the object image is produced on the model of volume data, the three-dimensional operation such as rotation and deformation of a component is easy to make.

So far, the following methods have been used for obtaining three-dimensional volume information of an object:

(1) Slit light or laser light indicating coordinates is irradiated on the object itself, thereby obtaining three-dimensional coordinates on the object surface.

(2) Coherent light is irradiated on the object so as to produce a moiré image, and the shape is obtained by measuring the distance to the object from this moiré image.

(3) An approximate shape of the object of interest is generated on the display by computation, and the operator edits this shape while viewing the shape.

The techniques of methods (1) and (2) are described in detail in "Handbook of Optical Measurement" (edited by Toshiharu Denko and published by Asakura Shoten), pp 582–595.

The methods (1) and (2) need special measuring apparatus. Because it takes a long time to measure, a person and so on are compelled to stand still when their shapes are inputted. In the method (3), since the shape is modeled by use of a computer, a skilful operator must edit in a long time.

It is also well known that the image of an object is photographed without a special apparatus and used for measuring the shape, as described in the literature of "Digital Composition of Images with Increase Depth of Focus Considering Depth Information", written by Satoshi A., Sugimoto and Yoshiki Ichioka, Applied Optics, vol. 24, Nov. 14, 1985. This method is used for image signal processing in microscopes. This known technique uses a plurality of images photographed while the focal plane is being slightly shifted, detects the in-focus condition from some of the high-frequency signal components included in the images, and measures the distance to the object from this focal point position and the current condition of the lens. In addition, volume data is obtained by converting the result of the distance measurement.

U.S. Pat. No. 4,584,704 discloses the apparatus for producing three-dimensional volume data from a plurality of images which are obtained by shifting the focal point of the camera lens, this three-dimensional volume data showing a plurality of positions of the object within the field of view of the camera.

SUMMARY OF THE INVENTION

In the above known examples, the in-focus or out-of-focus condition is decided from the presence of the high-frequency components of the video signal obtained by photographing the object. However, depending on the object, the image signal in the in-focus condition contains no high-frequency component. In such case, the measured distance may become erroneous. More specifically, in order to measure the three-dimensional shape of the object with high precision, it is necessary to measure at every measurement points of the image the power of the high-frequency components of the image signal within a very small interval of the scan lines or within a small block centering about the measurement point. It is also necessary to detect the in-focus condition and obtain the distance of the measurement point after discriminating the image of the largest high-frequency component power from the other ones of a plurality of images obtained at different focal points. When the object surface lacks the texture which creates high-frequency components in the image, the in-focus condition cannot be detected from the comparison of high-frequency power among the very small intervals, and thus the distances to the measurement point cannot be measured.

Accordingly, it is an object of the invention to provide an apparatus with a simple construction capable of fast and correctly measuring the three-dimensional shape of the object even when the object surface itself lacks the texture which produces high-frequency components in the image.

It is another object of the invention to provide a volume data obtaining apparatus for obtaining the three-dimensional shape data of the object and the associated image data (brightness, color) at a time.

A volume data obtaining apparatus of the invention has characteristic means for projecting a two-dimensional reference optical image containing a large amount of spatial high-frequency components on the surface of an object. In addition, it has image pickup means for picking up the image of the object on which the two-dimensional optical image is projected, while the focal plane is being slightly shifted, means for detecting the position of an in-focus image from an image signal of a plurality of images of different focused states which are picked up by this image pickup means, and means for measuring the distance to the object from the focusing condition of the lens under which the in-focus state can be obtained. The image pickup means is of the two-dimensional type for fast picking up an image.

Since the two-dimensional reference optical image is projected on the surface of the object, the image of the object contains a large amount of spatial high-frequency components even if the object lacks a texture and irregular surface. The means for picking up the object while the focal plane is being slightly shifted sequentially picks up a plurality of images while the focal plane is being shifted in the depth direction. The means for detecting the position of an in-focus image detects the power of the high-frequency components within a very small interval of a scan line passing through each of a plurality of detection points on the image, or within a very small block around each of the detection points, discriminates the image with the largest high-frequency power from the other ones of a plurality of images, and selects the in-focus image associated with that detection point. By the comparison and discrimination at each of the measurement points, it is possible to calculate the distance to each of the measurement points and obtain three-dimensional volume data indicative of the shape of the object. Since the means for projecting the two-dimensional image on the object is combined with the two-dimensional image pickup means for picking up the image of the object while the focal plane is being shifted, the precise decision of in-focus/out-of-focus state can be performed irrespective of the surface of the object, and thus error in measurement can be prevented.

The means for projecting the two-dimensional reference optical image may be typically the construction having a film with a two-dimensional image attached which is projected to the object. Another construction is possible in which a high-frequency signal is converted into an optical image by a two-dimensional display and the optical image is projected on the object. In these constructions, it is desirable to employ a projecting optical system with a large depth of field in order to form a clear reference image on the surface of the object. Moreover, the laser beam intensity-modulated by a high-frequency signal may be deflected to scan the object.

According to another feature of the invention, the volume data obtaining apparatus has first image pickup means for picking up a first image of the object which contains the signal of the two-dimensional reference optical image, and second image pickup means for picking up a second image of the object which contains no signal of the two-dimensional reference optical image. The video signal from the first image pickup means is used to obtain the three-dimensional volume data of the object, and the video signal from the second image pickup means is used to obtain the image data (color, brightness, texture) of the object itself. In order to separately treat the first and second images, the two-dimensional reference optical image is formed by use of light within a particular wavelength range out of the visible light range, for example, infrared light. The first image pickup means is formed of an image pickup device having the sensitivity to the light within the particular wavelength range. The second image pickup means is provided with an optical filter for removing the light within the particular wavelength range. There is also another construction than the above given construction using the optical filter in order to separate the first and second images by wavelength difference. That is, means for intermittently projecting the two-dimensional reference optical image on the object is provided so that the first image is obtained as the image picked up during the period in which the the two-dimensional reference image is projected, and that the second image is obtained as the image picked up during the period in which the two-dimensional reference image is not projected.

BRIEF DESCRIPTION OF THE DRAWINGS

FIG. 3 is graphs of signal power vs. spatial frequency at different depths in the embodiment of FIG. 1.

FIG. 4 schematically shows data stored in the image memory in the embodiment.

FIGS. 5A-5D show maps of high-frequency power represented by numerical values in the embodiment of FIG. 1.

FIGS. 6A-6D are graphs of high-frequency vs. focal position in the embodiment of FIG. 1.

FIG. 7 shows a map of focal positions where the maximum power is obtained in the embodiment of FIG. 1.

DESCRIPTION OF THE PREFERRED EMBODIMENTS

Figure 1:
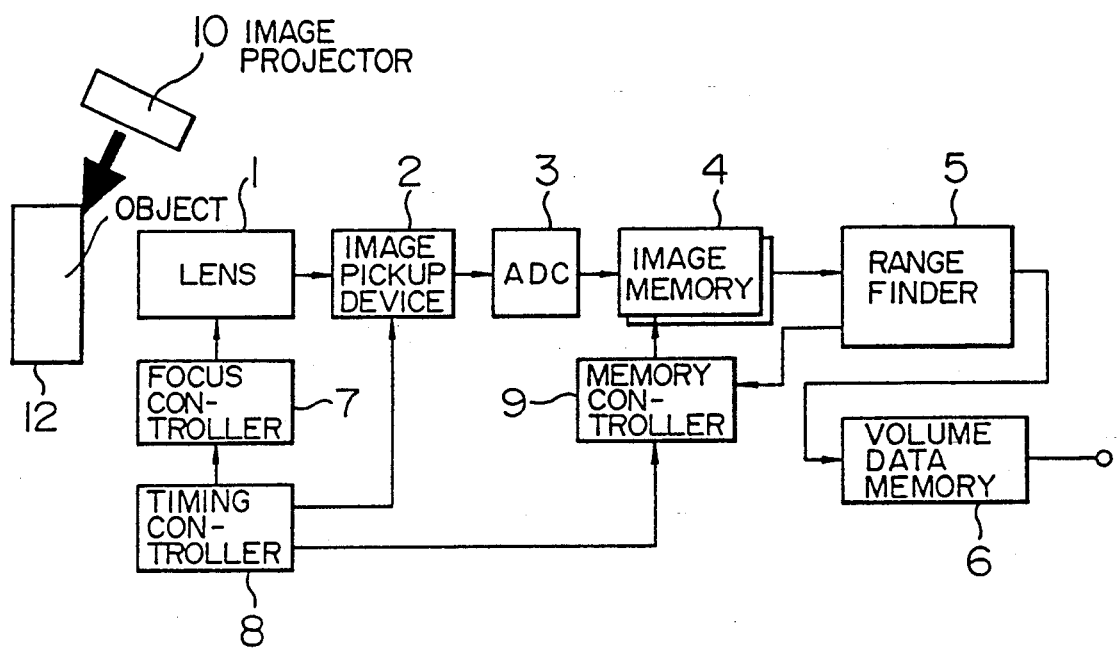
FIG. 1 is a block diagram of the volume data obtaining apparatus of an embodiment of the invention.

FIG. 1 is a block diagram of the volume data obtaining apparatus of one embodiment of the invention. This apparatus includes a lens 1, a two-dimensional image pickup device 2, an analog-to-digital converter (ADC) 3, an image memory 4, a range finder 5, a volume data memory 6, a focus controller 7, a timing controller 8, a memory controller 9 and an image projector 10. In addition, there is shown an object 12 of which the volume data is measured.

The operation of the volume data obtaining apparatus will be described below. The focus controller 7 acts on the lens 1 to slightly shift the focal plane where an in-focus image is formed, or the distance from this lens to the object. The image pickup device 2 picks up the image signal each time the focal plane is changed, and supplies the image signal to the ADC 3. The ADC 3 converts the input analog image signal into a digital signal, and supplies it to the image memory 4. Thus, the image memory 4 stores a plurality of images of the same object 12 which are formed at different best focal positions. The image projector 10 generates a high-frequency signal, converts this signal into a two-dimensional image pattern, and projects a two-dimensional reference optical image containing many spatial high-frequency components on the object 12. The projected two-dimensional optical image on the object 12 is reflected therefrom and converted into a video signal by the image pickup device. The construction and operation of the image projector 10 will be mentioned in detail later.

The timing controller 8 controls the focus controller 7 and the image pickup device 2 so that the focal plane can be changed in synchronism with the frame or field frequency of the image pickup device 2. The timing controller 8 also controls the memory controller. 9. As a result, the memory can regularly store the images classed by the focus conditions. The range finder 5 detects the in-focus image from a plurality of stored images and detects the distance from that detected image point on the object surface to the lens from the selected lens condition for the image. The resulting distance map is the three-dimensional volume data indicating the shape of the object. This volume data is stored in the volume data memory 6. The data stored in the volume data memory 6 is read and supplied to a host computer not shown, if necessary.

Figure 2:
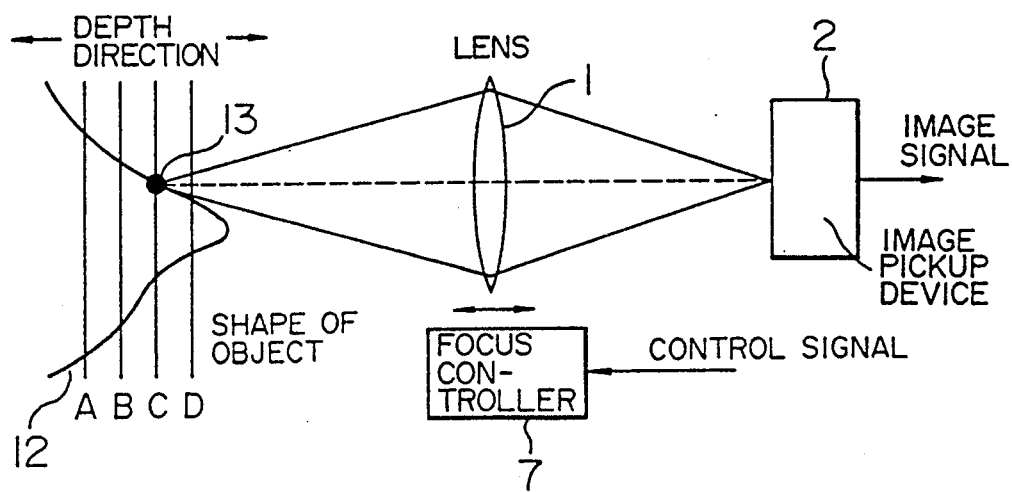
FIG. 2 is a block diagram useful for explaining the input of different depth points of an object in the embodiment of FIG. 1.

The method of measuring the distance to the surface of the object will be described with reference to FIGS. 2 and 3. FIG. 2 shows a part of FIG. 1. Like elements corresponding to those in FIG. 1 are identified by the same reference numerals. FIG. 3 schematically shows the distribution of signal power for use in deciding the in-focus condition. The operation of the apparatus at the time of photographing the object image 12 which changes in the depth direction will be described with reference to FIG. 2. The image of the object 12 is passed through the optical lens system 1 and formed on the image-sensing surface of the image pickup device 2. The focus controller 7 slightly shifts the position of the lens for focusing adjustment in accordance with a control signal so that the focal plane for the best in-focus condition is moved as A→B→C→D. The result is that the image pickup device 2 produces four image signals of the images at the different focal positions, A, B, C and D. At this time, the image at a position 13 on the object is in focus when the lens is at the focal position C, but out of focus when it is at the other focus positions A, B and D. When the image is out of focus, the lens 1 acts as a two-dimensional high-cut off filter, thus attenuating the spatial high frequency components. Therefore, the spectrum of the image signal is changed. FIG. 3 is graphs of the signal power of ordinate with respect to the spatial frequency of abscissa, or shows one-dimensional spectra of the image signal at the focal positions A, B, C and D. The spectrum of the in-focus image at C in FIG. 3 has the highest-power high-frequency components as compared with the out-of-focus images at A, B and D. Thus, the in-focus condition of the image at any position can be detected by comparing the power of the high-frequency components of each image with another at the same point. The distance to the surface of the object can be calculated from the condition of the lens which gives the best in-focus condition. The range finder 5 in FIG. 1 detects the in-focus position from the comparison of the power of high-frequency components, calculates the distance from the focal position (A, B, C or D) of the lens to the surface of the object, and causes the result to be stored in the volume data memory 6. While in the above description the lens is acted to shift, changing the focal plane, the image pickup device may be moved in the direction perpendicular to the optical axis in order to change the focal plane. In addition, a ferrodielectric substance such as gadolinium molybdate may be inserted in the light path for forming the object image and controlled in an electric field to change its refractive index. Moreover, a glass disk with the thickness changed may be used and mechanically rotated to change the length of the optical path. The focal plane can be moved by any other means than the above given methods.

FIGS. 4 to 7 are diagrams to which reference is made in explaining the two-dimensional operation for obtaining the volume data of the object in the embodiment. In order to detect whether the image is in focus or not by comparing the high-frequency components of the image signals, it is necessary to cut out the image signal of a very small interval of the scan line passing through each of a plurality of detection points to be measured and extract the high-frequency components. In more general, the high-frequency components are extracted from all the plurality of scan lines passing through the very small range around the detection point to be measured. In this embodiment, the high-frequency components are not extracted directly from the image signal produced from the image pickup device 2, but the best in-focus position is detected from the image signal which is sampled by the ADC 3 and stored in the image memory 4. The stored image signal is not a continuous analog signal, but a group of image signals as shown at 24 in FIG. 4. Thus, the range finder 5 reads a signal of a picture element 30 within a block 25 of a predetermine area indicated at 25 in FIG. 4 and calculates the high spatial frequency components of this block 30. FIG. 4 shows one block of 4×4 picture elements to be read. In this case, the range finder 5 extracts the high spatial frequency components of signal level of each row, each column of the block by use of a high-pass filter, and determines the sum of these values as the evaluation value for the high-frequency power of the block. When the high-frequency power evaluation value is calculated for 4×4, or 16 blocks over all the image, the high-frequency power map can be obtained as shown in FIG. 5A at 26. The numerical values within the map 26 indicate the calculated high-frequency power evaluation values of the respective blocks. Such high-frequency power map is produced for the image data picked up at each of the focal planes A, B, C and D mentioned with reference to FIG. 2. The maps 26, 27, 28 and 29 shown in FIGS. 5A, 5B, 5C and 5D, respectively, correspond to the focal planes A, B, C and D, respectively. Here, the best in-focus position is decided by comparing the high-frequency power evaluation values at the same block. For example, at the first row-first column (abbreviated 1-1) 30, when the focal position is changed as A→B→C→D, the high-frequency signal is changed as 3→5→9→5. The plot of this high-frequency signal is shown at 40 in FIG. 6A. From this plot, it will be seen that the object surface exists in the focal position C at which the maximum high-frequency power is obtained. Similarly, when the first row-other columns (1-2, 1-3, 1-4) elements are examined, the high-frequency signal values can be obtained as indicated by the plots 41, 42 and 43 shown in FIGS. 6B, 6C and 6D, respectively. The focal positions at which the maximum high-frequency power can be obtained are selected to produce the map of the distance from the-lens to the object surface as shown in FIG. 7 at the first row. The above operations are repeated for all the blocks to produce a distance information map 44 shown in FIG. 7. The distance map 44 is information of the distance from the lens to the detection point. If a certain cross-section of the object is taken as a reference surface, it can be converted into the volume data map of the object with ease. This volume data map is stored in the volume data memory 6 in FIG. 1.

Figure 8:
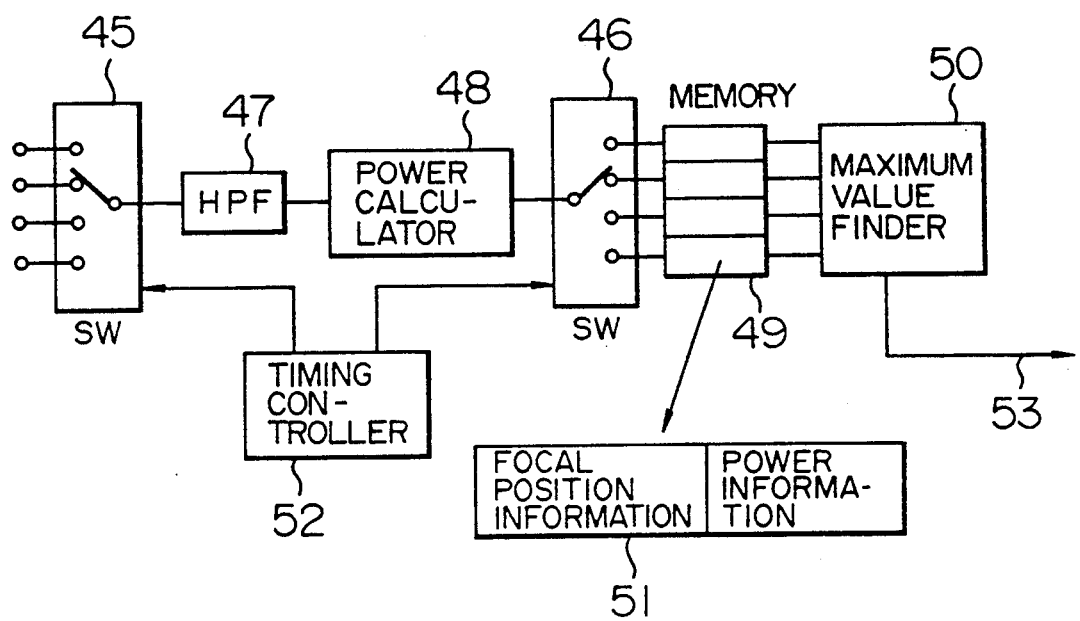
FIG. 8 is a detailed block diagram of the rang finder in the embodiment of FIG. 1.

The construction and operation of the range finder 5 will be described below. FIG. 8 is a block diagram of the construction of the range finder 5. A timing controller 52 changes the position of a switch 45, thus controlling the switch to sequentially select image data of a plurality of images of different focal planes stored in the image memory 4. The timing controller 52 also supplies a read control command to the memory controller 9 so that image data at each row, column element of each block are read in turn as described with reference to FIG. 4. The read image signal of each row, each column is supplied through a high-pass filter 47 to a signal power calculator 48. The signal power calculator 48 makes the sum of the high-frequency components of each low, each column image signal passed through the high-pass filter 47 and finds the high-frequency power evaluation values of blocks as described above. The high-frequency power evaluation values sequentially found for the different blocks, focal plane images are supplied through a switch 46 which is controlled by the timing controller, to a memory 49 where they are stored in turn. Thus, a plurality of high-frequency power maps as shown in FIGS. 26, 27, 28, 29 in FIG. 5 are stored in the memory 49. The data at each address in the memory 49 is formed of a pair of focal position information and high-frequency power evaluation value as shown in FIG. 8 at 51. A maximum value finder 50 compares a plurality of high-frequency power maps stored in the memory 49 and detects the maximum power evaluation value at each map address, or at each detection point, thus producing data at the focal position (A, B, C, D) where this maximum value can be obtained. This data at each focal position, or positional data obtained by conversion and indicative of the distance from the reference plane are written in the volume data memory 6 in FIG. 1, so that the volume data map shown in FIG. 7 can be produced. While in the embodiment shown in FIG. 8 the high-pass filter is used for the detection of high-frequency power, it may be a band-pass filter. The use of a band-pass filter therefor will provide an effect of reducing the influence of noise.

Figure 9:
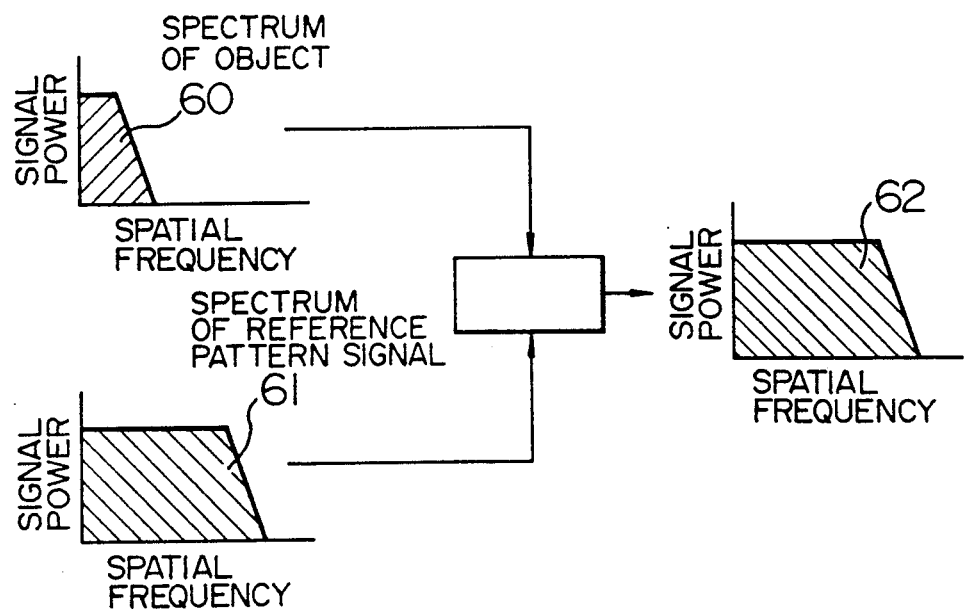
FIG. 9 is graphs of signal power vs. spatial frequency showing the spectrum change when the reference signal is applied in the embodiment of FIG. 1.

The function, construction and operation of the image projector 10 of the embodiment will be described in detail. The main feature of this embodiment is that a two-dimensional optical image for reference which has a large amount of spatial high-frequency components is projected on the object, thereby obtaining the volume data, though not described with reference to FIGS. 2 to 8. In general, the picked up image of the object does not always contain a large amount of spatial high-frequency components even if it is in focus. Particularly, for the volume data, the image signal in a very small range around each of a plurality of detection points is cut out as a block and the spatial high-frequency components are extracted from the block so that the distance data is obtained. However, the image in the very small range often contains no high-frequency components. In such case, the distance measurement cannot be made by extracting the high-frequency information. Even if the distance measurement is made, the result will have low reliability. Therefore, in this embodiment, the two-dimensional optical image for reference which contains a great amount of spatial high-frequency components is projected on the object, and the image of the object is picked up in order that the in-focus or out-of-focus condition can always be decided not depending on the spectrum of the image signal which the object possesses. This two-dimensional optical image for reference may be a real image having sufficiently higher spatial frequencies than the high cutoff frequency of the lens. More specifically, it may be the two-dimensional optical image having the spatial frequencies higher than the high cutoff frequency of the lens over all the effective region when the image is out of focus by the distance corresponding to the depth-direction resolution of the volume data to be obtained. This reference signal and the signal which the object itself has are added on the object surface. The result is that the image formed on the image pickup device contains a sufficient amount of high-frequency components. FIG. 9 shows the spectra of the object itself, the reference signal and the sum. A frequency spectrum 60 of the image within a very small range of the object surface is added to a frequency spectrum 61 of the image projected from the image projector 10 so as to produce a wide-band signal 62. Thus, the in-focus or out-of-focus condition can be decided by detecting the high-frequency components of the picked-up image.

Figure 10:
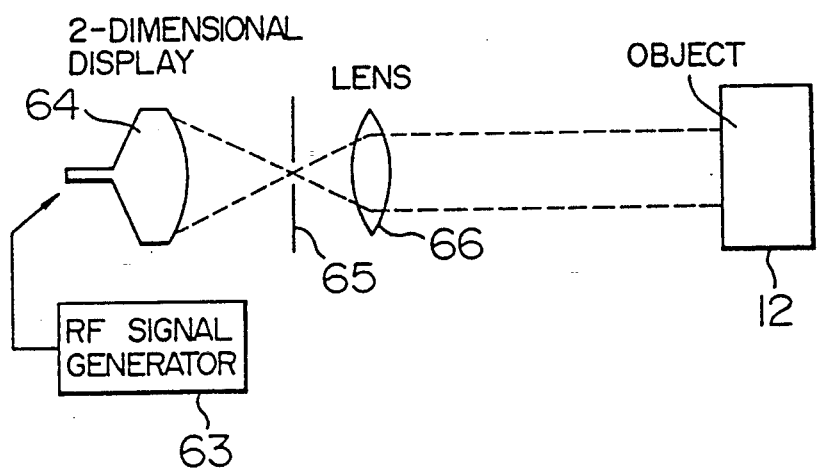
FIG. 10 is a block diagram of one example of the image projector in the embodiment of FIG. 1.

FIG. 10 shows one example of the image projector 10. An RF signal generator 63 generates an electric signal which has much higher frequencies, when they are converted into spatial frequencies, than the resolution of the lens. A two-dimensional display 64 converts this electric signal into an image. The image on the two-dimensional display 64 is passed through a projection lens 66 and formed on the surface of the object 12. An aperture 65 is provided near the lens 66 in order that the projected two-dimensional reference image is prevented from being defocused by the cubic nature and irregular surface of the object. In other words, the F-number of the optical system for projection is sufficiently increased to increase the depth of field of the optical system. Thus, the reference light rays to be irradiated on the object 12 are substantially parallel so that a two-dimensional image is clearly projected on the surface of the object 12. The RF signal generator 63 may generate a random pattern of a flat frequency distribution such as Gaussian noise or a repetitive signal such as a sine wave. In this case, it is desired that the same signal be repeatedly generated in synchronism with the frame period of the two-dimensional display 64 to produce a two-dimensional image which is not changed with lapse of time.

Figure 11:
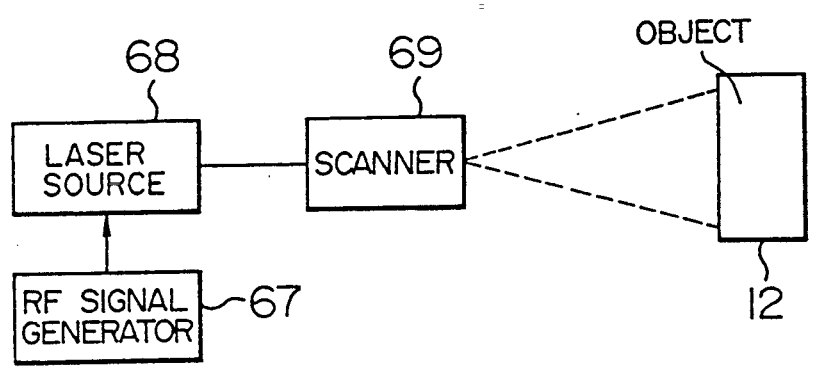
FIG. 11 is a block diagram of another example of the image projector.

FIG. 11 shows another example of the image projector 10. An RF signal generator 67 same as that 63 shown in FIG. 10 generates an output signal which modulate the intensity of the output laser beam from a laser source 68. This modulated laser beam is deflected horizontally and vertically by a scanner 69 so as to scan the object 12, or the two-dimensional reference image is irradiated thereon. This scanner 69 may be a polygon mirror or an acousto-optical modulator. The laser beam has a going-straight ability because of its coherence property. Thus, the two-dimensional reference optical image can be projected on the object surface with high resolution even when the condenser lens is not used. The period of the two-dimensional scanning by the scanner should be selected to be shorter than the frame period of the image pickup device 2 shown in FIG. 1. If it is selected so, the two-dimensional optical image formed by the laser-beam scanning can be irradiated over all the image sensing surface of the image pickup device 2. It is also desirable that the RF signal generator 67 be repeatedly generate the same high-frequency signal in synchronism with the two-dimensional scanning period of the scanner 69.

Figure 12:
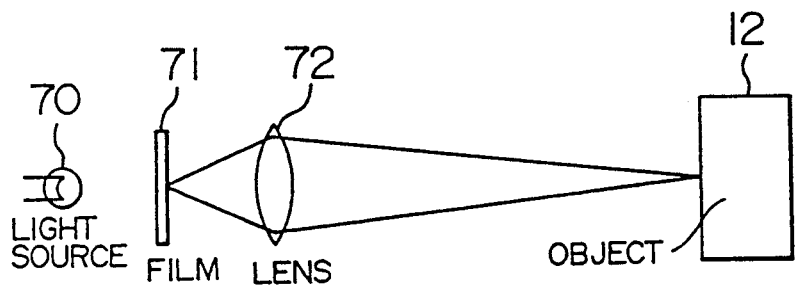
FIG. 12 is a block diagram of still another example of the image projector.

FIG. 12 shows still another example of the image projector 10. A film 71 is provided which has formed thereon a two-dimensional image pattern containing a large amount of high spatial frequency components. This pattern is projected on the object 12 by a light source 70 and a lens 72 provided on the back side of the film. In this case, although the reference signal to be irradiated cannot easily be changed, the construction of the apparatus can be simplified since the signal source is formed of the film 71 and light source 70.

Figure 13:
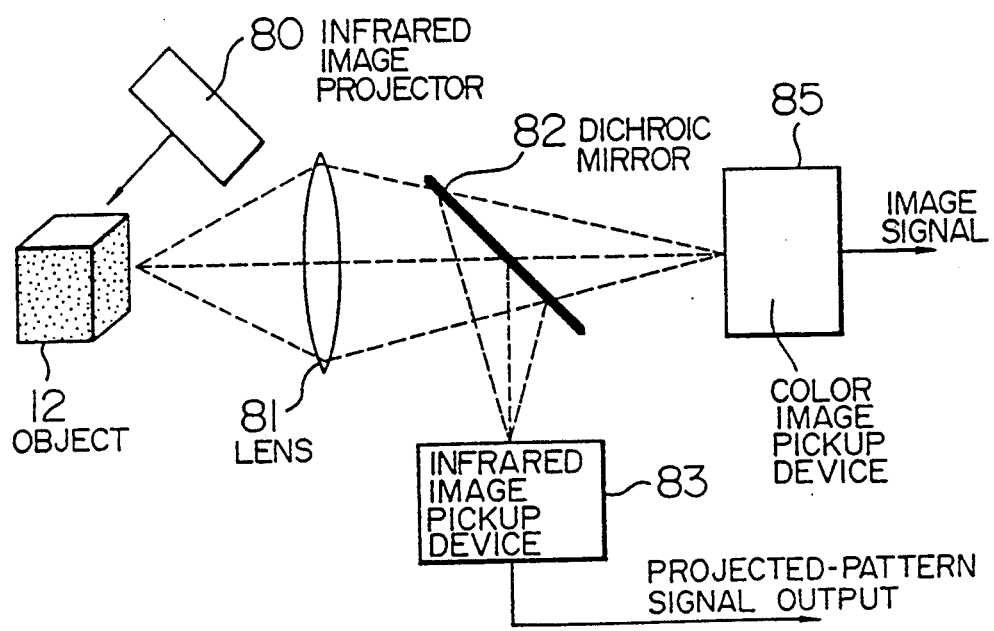
FIG. 13 is a block diagram of the optical portion of another embodiment of the invention.

FIG. 13 shows the optical portion of another embodiment of the invention. In this embodiment, an image projector 80 projects an infrared two-dimensional reference image on the object 12. This image projector can be realized by substituting an infrared laser for the laser source shown in FIG. 11 or an infrared light source for the light source shown in FIG. 12. The light from the object 12 is passed through a lens 81 and forms an image on a color image pickup device 85. At this time, a half mirror 82 for selectively reflecting the infrared light is inserted on the midway of the optical path, thereby separating the light into an infrared reference signal and a RGB video signal. The separated infrared reference signal is supplied to an infrared image pickup device 83 so that this infrared reference signal is used for the judgement of in-focus or out-of-focus state. The image pickup device 85 receives the RGB video signal and produces an image signal as information of brightness, color and pattern of the surface of the object. The effect of producing the video signal of the object in addition to the reference signal as described above is particularly active in texture mapping. The texture mapping in the computer graphics produces an object model on the basis of cubic information and makes magnification, rotation, deformation and so on for this model image by computation. When a desired shape is obtained, a pattern (texture) is attached to that image, thus adding quality feeling and reality. When the RGB video signal and the shape data are picked up at a time as described above, the characteristic texture of the actual object itself can be obtained as image data. In addition, by mapping for the image after magnification, rotation, deformation and so on, it is possible to make a more realistic image substantially similar to the actual object than by mapping for the texture produced by a computer.

Figure 14:
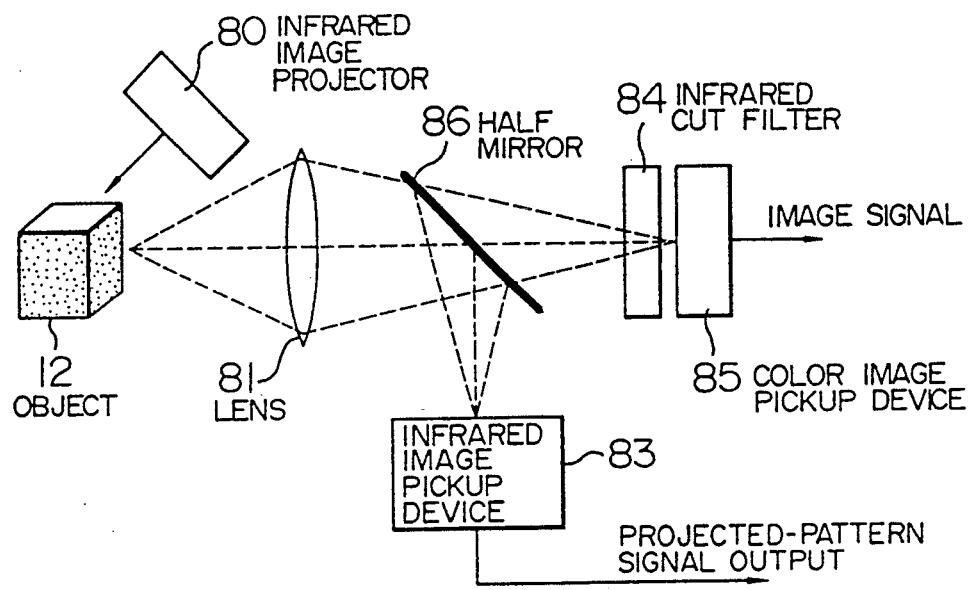
FIG. 14 is a block diagram of a modification of the optical portion of FIG. 13.

FIG. 14 shows a modification of the embodiment of FIG. 13. While in the embodiment of FIG. 13 the infrared half mirror 82 is used to separate the image of the object itself and the image for volume data, a half mirror 86 may be used to divide the light from the lens into two parts as shown in FIG. 14. The infrared image pickup device 83 receives the infrared reference pattern. In addition, an infrared-cut filter 84 may be placed before the other image pickup device 85 so as to remove unnecessary infrared rays. In this case, the signal of natural light arrived at the infrared image pickup device is lost. However, even in this embodiment it will be easily understood that the infrared reference pattern can be detected. While in the embodiments of FIGS. 13 and 14 infrared ray is used for the projection of the two-dimensional reference image, light out of the visible light region may be used. In this case, the image information of the object which is not affected by the reference image can be obtained together with the volume data. However, from the viewpoint of the effect of the light irradiation on the object and the realization of apparatus, it is the best to employ infrared light.

Figure 15:
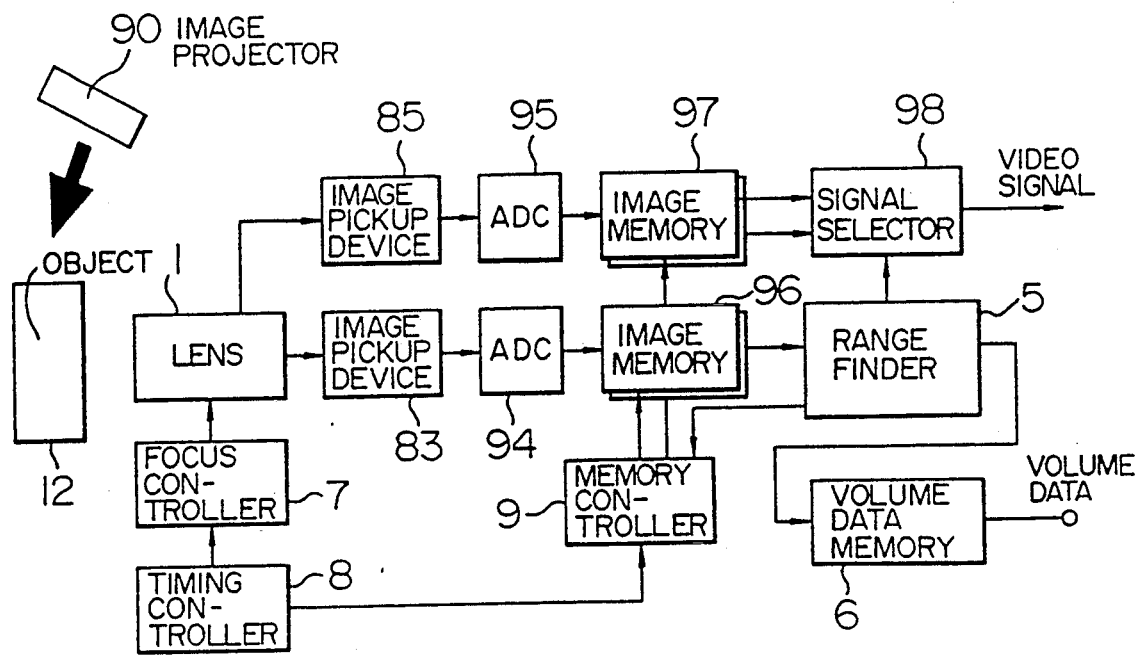
FIG. 15 is a block diagram of the whole system of another embodiment employing the optical portion of FIG. 13 or FIG. 14.

FIG. 15 is a block diagram of the volume data obtaining apparatus employing the optical portion of the embodiment of FIG. 13 or 14. The image data of the two-dimensional reference image picked up by the infrared image pickup device 83 is supplied to an analog-to-digital converter (ADC) 94 and then stored in an image memory 96. The range finder 5, the volume data memory 6, the focus controller 7, the timing controller 8 and the memory controller 9 have the same constructions as in the embodiment of FIG. 1. The volume data is similarly obtained by discriminating the high-frequency components. The color image signal picked up by the color image pickup device 85, or the image signal with the effect of the two-dimensional reference optical image being removed is supplied to an analog-to-digital converter (ADC) 95, and then stored in an image memory 97. The color signal of the object stored in the memory 97 is read through a signal selector 98. This signal selector 98 acts to select an in-focus image from the signal picked up with the focus condition changed. In other words, the memory 97 stores images of different focus conditions, from which only the in-focus image is selected by the selector, which thus produces a high-resolution signal. The range finder 5 generates a selection signal and supplies to this signal selector 98, thereby controlling it.

Figure 16:
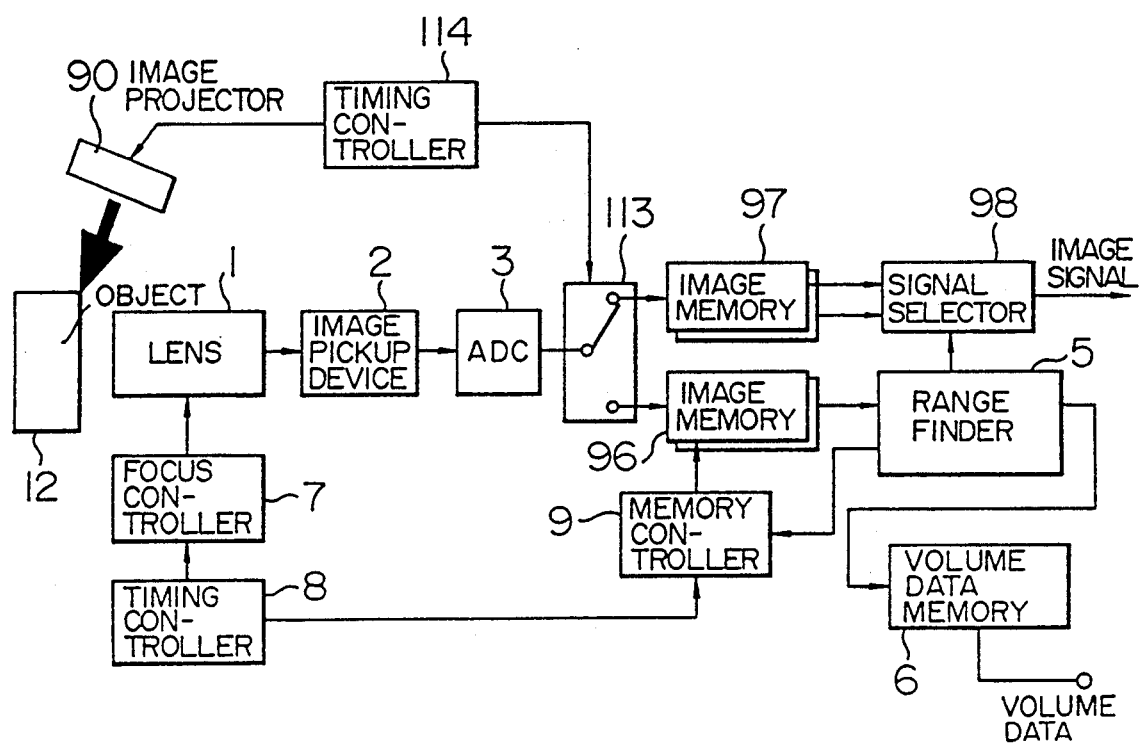
FIG. 16 is a block diagram of the three-dimensional volume data obtaining apparatus of still another embodiment.
Figure 17:
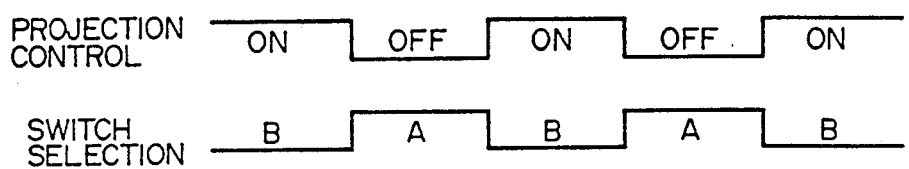
FIG. 17 is a timing chart of the control signal in the embodiment of FIG. 16.

FIG. 16 shows still another embodiment of the invention. In this embodiment, visible light is used for the projection of the two-dimensional reference optical image, and image data of the object which is not affected by the reference optical image is obtained together with the volume data of the object. The image projector 90 is controlled by a timing controller 114 so as to intermittently project the two-dimensional reference image to the object 12. The video signal from the image pickup device 2 is sampled by the ADC 3, and then supplied through a switch 113 to the image memories 96 and 97. The two-dimensional reference optical image is projected for the period in which the switch 113 stays in the B-position and stopped for the period in which the switch 113 stays in the A-position as shown in FIG. 17. Thus, the image memory 96 selectively stores the image containing the spatial frequency components of the two-dimensional reference optical image, and the image memory 97 stores the image which is not affected by the two-dimensional reference optical image. The range finder 5, the memory controller 9, the focus controller 7 and the signal selector 98 make the same operation as in the embodiment of FIG. 15. Therefore, the range finder 5 calculates the volume data of the object from the image signal containing the components of the reference optical image. The volume data is stored in the volume data memory 6. The signal selector 98 selects the in-focus image from the images at all the positions on the object surface. In this embodiment, since the data of the brightness and color of the image which can be used upon texture mapping can be obtained together with the volume data, it is possible to make more natural texture mapping.

What is claimed is:

1. An apparatus for obtaining three-dimensional volume data of an object comprising:

image projector means for projecting a two-dimensional reference optical image containing spatial high-frequency components to said object;

two-dimensional image pickup means for picking up the image of said object on which said two-dimensional reference optical image is projected, while a focal plane is being shifted;

range finder means for extracting the high-frequency components of an image signal of a very small region including each of a plurality of detection points on the image picked up by said image pickup means and detecting the best focal plane position where an in-focus condition is given to each of said plurality of detection points, from the change of the high-frequency components with the shift of said focal plane; and memory means for storing data of the said best focal plane detected at each of said detection points as three-dimensional volume data;

wherein said image projector means comprises means for generating a high-frequency signal, two-dimensional display means for converting said high-frequency signal into a two-dimensional image, and an optical system for projecting said two-dimensional image on said object.

2. An apparatus for obtaining three-dimensional volume data of an object according to claim 1, wherein said high-frequency signal generator means repeatedly generates a same high-frequency signal in synchronism with a frame period of said two-dimensional display means.

3. An apparatus for obtaining three-dimensional volume data of an object comprising:

image projector means for projecting a two-dimensional reference optical image containing spatial high-frequency components to said object;

two-dimensional image pickup means for picking up the image of said object on which said two-dimensional reference optical image is projected, while a focal plane is being shifted;

range finder means for extracting the high-frequency components of an image signal of a very small region including each of a plurality of detection points on the image picked up by said image pickup means and detecting the best focal plane position where an in-focus condition is given to each of said plurality of detection points, from the change of the high-frequency components with the shift of said focal plane; and memory means for storing data of the said best focal plane detected at each of said detection points as three-dimensional volume date;

wherein said image projector means comprises means or generating a high-frequency signal, means for generating a modulated laser beam that is modulated in intensity by said high-frequency signal, and scanner means for two-dimensionally deflecting said laser beam to scan said object.

4. An apparatus for obtaining three-dimensional volume data of an object according to claim 3, wherein said high-frequency signal generating means repeatedly generate a same high-frequency signal in synchronism with the two-dimensional scan period of said scanner means.

5. An apparatus for obtaining three-dimensional volume data of an object according to claim 4, wherein said scanner means two-dimensionally deflects said laser beam with a period shorter than a frame period of said two-dimensional image pickup means.

6. An apparatus for obtaining three-dimensional volume data of an object comprising:

image projector means or intermittently projecting a two-dimensional reference optical image containing spatial high-frequency components on said object;

two-dimensional image pickup means for picking up the image of said object while a focal plane is being shifted;

first image memory for storing an image signal of each of a plurality of images produced from said two-dimensional image pickup means, which correspond to a plurality of positions of said focal plane during the period in which said two-dimensional reference optical image is projected;

second image memory for storing an image signal of images produced from said two-dimensional image pickup means during the period in which said two-dimensional reference optical image is not projected;

range finder means for calculating evaluation values of intensity of spatial high-frequency components within a plurality of image blocks of each of a plurality of images stored in said first image memory, and comparing the evaluation values of image blocks at the same position on each of said plurality of images so as to detect data of a focal plane position where an in-focus condition is given, for each image block; and memory means for storing data of the said focal plane detected at each of said plurality of image blocks as three-dimensional data of said object.

* * * * *